(12) United States Patent
Huang et al.

(10) Patent No.: US 11,460,641 B2
(45) Date of Patent: Oct. 4, 2022

(54) FREE-SPACE OPTICAL COLLIMATOR

(71) Applicant: Alliance Fiber Optic Products, Inc., Sunnyvale, CA (US)

(72) Inventors: Yu Huang, Sunnyvale, CA (US); Dong Gui, San Jose, CA (US); Qijun Xiao, Freemont, CA (US); Yao Li, Sunnyvale, CA (US); Andy Zhou, Freemont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 1361 days.

(21) Appl. No.: 15/381,352

(22) Filed: Dec. 16, 2016

(65) Prior Publication Data

US 2018/0128983 A1     May 10, 2018

Related U.S. Application Data

(60) Provisional application No. 62/388,380, filed on Dec. 18, 2015.

(51) Int. Cl.
| | |
|---|---|
| *G02B 6/32* | (2006.01) |
| *G02B 6/36* | (2006.01) |
| *G02B 6/293* | (2006.01) |
| *H04J 14/02* | (2006.01) |

(52) U.S. Cl.
CPC ............. *G02B 6/32* (2013.01); *G02B 6/2938* (2013.01); *G02B 6/29365* (2013.01); *G02B 6/3636* (2013.01); *H04J 14/0256* (2013.01); *H04J 14/02* (2013.01)

(58) Field of Classification Search
None
See application file for complete search history.

(56) References Cited

U.S. PATENT DOCUMENTS

| | | | |
|---|---|---|---|
| 6,748,133 B2 | 6/2004 | Liu et al. | |
| 8,488,244 B1 | 7/2013 | Li et al. | |
| 8,538,210 B2 | 9/2013 | Wang et al. | |
| 2003/0072520 A1* | 4/2003 | Wu ........................ | G02B 6/352 |
| | | | 385/18 |
| 2010/0329678 A1 | 12/2010 | Wang et al. | |

(Continued)

FOREIGN PATENT DOCUMENTS

| | | |
|---|---|---|
| CN | 105467521 A | 4/2016 |
| CN | 105739023 A | 7/2016 |

(Continued)

*Primary Examiner* — Jerry Rahll
(74) *Attorney, Agent, or Firm* — Robert L. Branham

(57) ABSTRACT

In various embodiments, free-space optical collimator and multi-channel wavelength division multiplexers including free-space optical collimators are provided. In one embodiment, for example, a free-space optical collimator includes a base having a length, a generally flat bottom surface and a top surface. A groove is disposed along the top surface of the base extending through the length of the base. A lens is disposed within the groove of the base and a fiber optic pigtail is disposed generally adjacent to a focal point of the lens. The lens and fiber optic pigtail are aligned within the groove to reduce an off-angle offset of an optical light signal propagating through the free-space optical collimator. In other embodiments, a process of producing a free-space optical collimator is also provided.

19 Claims, 8 Drawing Sheets

(56) References Cited

U.S. PATENT DOCUMENTS

2016/0187585 A1 6/2016 Yue
2016/0191192 A1 6/2016 Yue

FOREIGN PATENT DOCUMENTS

| CN | 105739025 A | 7/2016 |
| CN | 205507149 U | 8/2016 |
| CN | 205507151 U | 8/2016 |

* cited by examiner

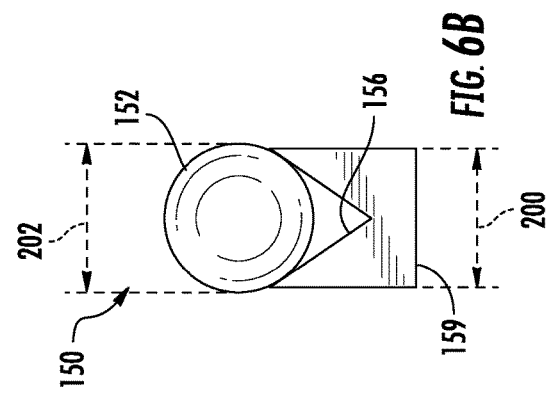
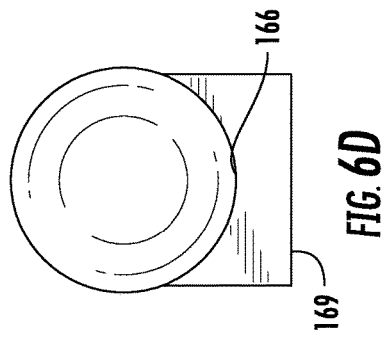
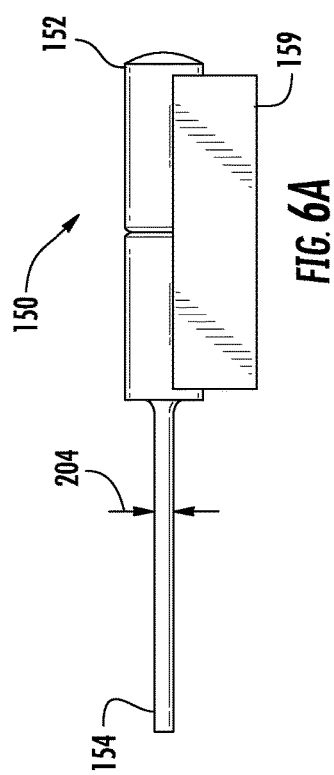
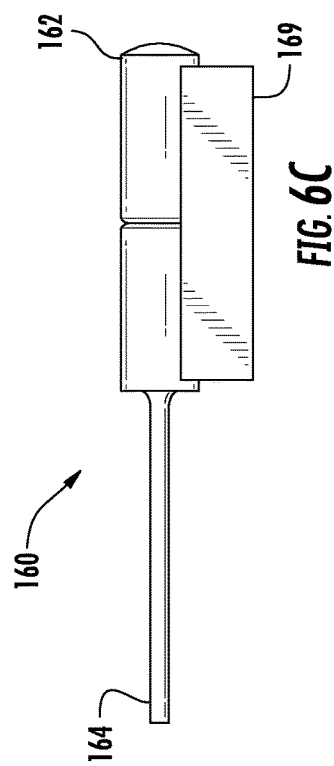

FREE-SPACE OPTICAL COLLIMATOR

CROSS-REFERENCE TO RELATED APPLICATIONS

This application claims the benefit of U.S. Provisional Application Ser. No. 62/388,380, filed Dec. 18, 2015, the full disclosure of which is incorporated herein by reference.

BACKGROUND

Field

The present disclosure relates to Wavelength Division Multiplexing (WDM) multiplexer/demultiplexers and collimators useful in such WDM multiplexer/demultiplexers.

Technical Background

Wavelength Division Multiplexing (WDM) is a technology in which multiple optical signals are multiplexed with different wavelengths of light combined by a multiplexer at a transmitter, directed to a single fiber for transportation of the signal, and split by a demultiplexer to designated channels at a receiver. As demand escalates for higher signal capacity with smaller form factors, the WDM devices that can accommodate with a compact form-factor (e.g, CFP4 and QSFP28) telecommunication and data communication equipment are favored. For optical modules in compact form factors such as CFP4 and QSFP 28, multiplexers/demultiplexers combine or separate multiple channels of signals with different operating wavelengths.

FIG. 1 shows a typical design of compact multiplexing/demultiplexing design 10, such as disclosed in U.S. Pat. No. 6,748,133, for example. For demultiplex purpose, a composite optical signal received via Fiber 1 is separated into respective individual channels or wavelengths for transportation via Fiber 2 through Fiber 5, and for multiplex purpose, individual channels or wavelengths received via Fiber 2 through Fiber 5 are combined into a composite optical signal for transportation via Fiber 1. In order to facilitate multiplexer/demultiplexer functionality, an array of optical filters/mirrors (Mirror 1 through Mirror 4) and an array of collimators (Collimator 1 through Collimator 5) are used for wavelength selection and signal reception, respectively. The aligned positions of collimators within a collimator array are secured by preformed wedges and then further bonded to a common substrate with bonding agent.

United States patent publication no. 2010/0329678 A1 also describes methods for mounting a collimator array to a substrate. FIGS. 2A-2D show four different mountings of collimators to a flat substrate using a pair of flexible wedges. The collimators include a hosting cylindrical tube for a consolidating glass lens and a fiber pigtail into a channel component. In each design, there are two contact surfaces for the wedges: one with the outer hosting tube, and the other with the substrate. The wedges are used in pairs to secure the collimators to the substrate.

As the growing need of upgrading for higher transmitting speed, more data lanes, and a smaller package form factor, the interspacing between neighboring channels is required to drop significantly in order to boost channel density. For wedge supported collimators (as shown in FIGS. 1 and 2A-2D), limitation on size shrinkage due to outer hosting tube and supporting wedges makes them less favored when the package size also become smaller and smaller. An alternative multiplexer/demultiplexer subassembly design is described in U.S. Pat. No. 8,488,244 and is shown in FIG. 3. This design includes a COM collimator, a glass block 304 with high reflectance coating 314 of the front side and a filter array 310 (each band filter has a distinctive wavelength range) attached to the end side, a micro-lens array 306 and a substrate on which all other components bond. The adoption of the micro-lens array 306 further reduces the necessary component size, and the high reflectance coating surface 314 on glass block 304 makes the COM port collimator and receiving port outlet parallel in order to fit in smaller form factor package without introducing component fitting and fiber routing issues.

Due to the fixed pitch of the micro-lens array 306 and the filter array 310, the position and angle of each channel cannot be adjusted individually. A number of compensating plates with different cut angles and lengths are needed to be inserted into the light path in order to compensate potential angle/position alignment errors.

Another compact WDM design is shown in FIG. 4. By utilizing a trapezoid prism, the light path turns 180 degrees, locating the COM port and the receiving ports on the same side of the device. This design can be improved to increase density by replacing the COM collimator with a single piece micro-lens array (MLA) and a fiber array unit (FAU).

The previously described ultra-compact WDM design configurations use a micro-lens array as focusing components for receiving ports. Thus, they suffer from misalignment errors and cannot be optimized for all receiving channels simultaneously. These misalignment errors come from the pitch error, miscut angle, tilt and offset of rigid focusing and receiving components. The errors can be either compensated by inserting a series of bevel angled glass plate (FIG. 3), or tightening component dimension specification requirement (FIG. 4). Both designs need to apply a complicated alignment and assembly process in order to measure the alignment errors and counteract the effects. Moreover, the last few channels are expected to have degraded optical performance due to the accumulating effect of error sources and are more sensitive to the environmental change such as temperature, humidity, and etc.

BRIEF SUMMARY

According to the subject matter of the present disclosure, new designs of multiplexer/demultiplexer assembly configurations and components thereof are provided. Signal transmitter and reception ports include miniature sized collimators, which allows not only for the potential of dramatic reduction of pitch sizes but also the ability to align of each channel individually.

In accordance with one embodiment of the present disclosure, for example, a free-space optical collimator is provided. The free-space optical collimator includes a base having a length, a generally flat bottom surface and a top surface. A groove is disposed along the top surface of the base extending through the length of the base. A lens is disposed within the groove of the base and a fiber optic pigtail is disposed generally adjacent to a focal point of the lens. The lens and fiber optic pigtail are aligned within the groove to reduce an off-angle offset of an optical light signal propagating through the free-space optical collimator.

In accordance with another embodiment of the present disclosure, a multi-channel wavelength division multiplexer (WDM) is provided. In this embodiment, the multiplexer includes a substrate, a multiplexer port and a plurality demultiplexer ports. The multiplexer port is configured to propagate a multiplexed optical signal and includes a first optical collimator mounted on a surface of the substrate. A first demultiplexer port of the plurality of demultiplexer ports is configured to propagate a first demultiplexed optical signal and includes a second optical collimator. A second demultiplexer port is configured to propagate a second demultiplexed optical signal and includes a third optical collimator. An optical filtering component is mounted to the substrate and is optically coupled between the multiplexer port and the pair of first and second demultiplexer ports. The optical filtering component is configured to separate a multiplexed light signal from the multiplexer port into at least first and second wavelength components and propagate the at least first and second wavelength components to the first and second demultiplexer ports, respectively. At least one of the first, second and third optical collimators includes a base having a length, a generally flat bottom surface and a top surface. A groove is disposed along the top surface of the base extending through the length of the base. A lens is disposed within the groove of the base and a fiber optic pigtail is disposed generally adjacent to a focal point of the lens. The lens and fiber optic pigtail are aligned within the groove to reduce an off-angle offset of an optical light signal propagating through the free-space optical collimator.

In accordance with yet another embodiment of the present disclosure, a process of producing a free-space optical collimator is provided. In one embodiment, for example, the process includes forming a groove in a top surface of a base element. The process also includes disposing a lens in the groove and a fiber optic pigtail at least generally adjacent to a focal point of the lens in the groove. The process includes aligning the lens and the fiber optic pigtail within the groove to reduce an off-angle offset of an optical light signal propagating through the free-space optical collimator and fixing the lens and fiber optic pigtail within the groove.

Although the concepts of the present disclosure are described herein with primary reference to WDM multiplexer/demultiplexers and optical collimators useful with such WDM multiplexer/demultiplexers, it is contemplated that the concepts will enjoy applicability to other optical systems as well. For example, and not by way of limitation, it is contemplated that the concepts of the present disclosure will enjoy applicability to other optical systems that employ collimators.

BRIEF DESCRIPTION OF THE SEVERAL
VIEWS OF THE DRAWINGS

The following detailed description of specific embodiments of the present disclosure can be best understood when read in conjunction with the following drawings, where like structure is indicated with like reference numerals and in which:

FIGS. 6A and 6B depict an example embodiment of an optical collimator, according to one or more embodiments described or shown herein;

FIGS. 6C and 6D depict another example embodiment of an optical collimator, according to one or more embodiments described or shown herein;

Figure 7:
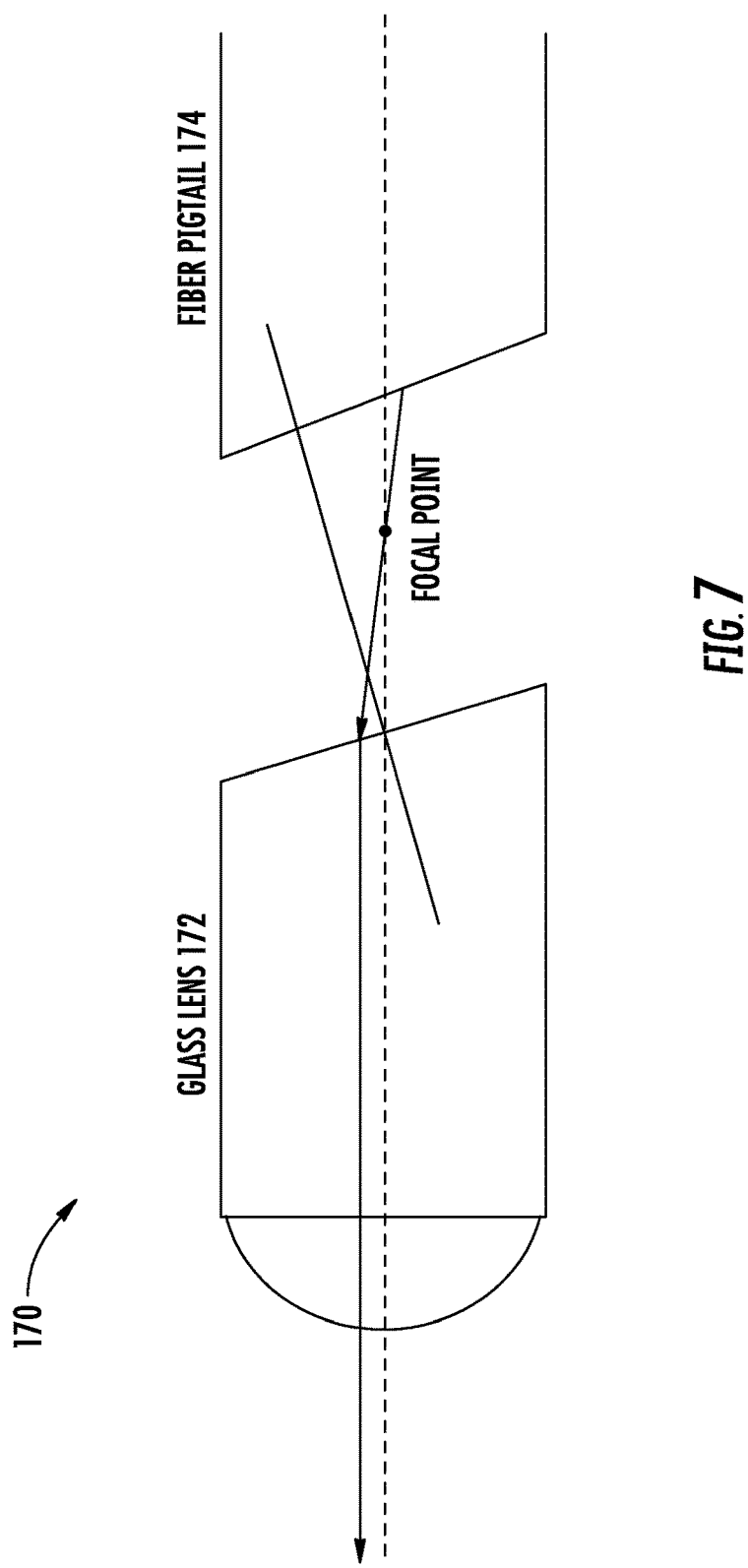
Figure 8:
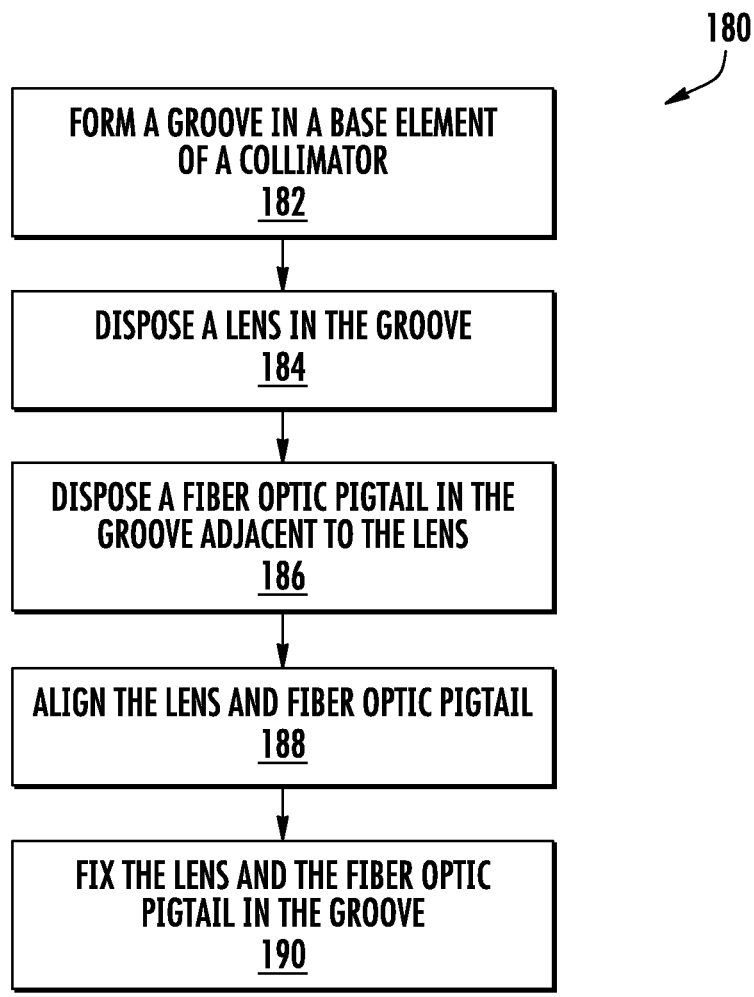

FIG. 7 depicts a schematic illustration of an example embodiment of an adjustable interface between a lens and a fiber optic pigtail of an optical collimator; and FIG. 8 depicts an example flowchart of a process 180 of constructing a collimator, such as for use on a substrate of a WDM multiplexer/demultiplexer or within another optical system, according to one or more embodiments described or shown herein.

DETAILED DESCRIPTION

Figure 1:
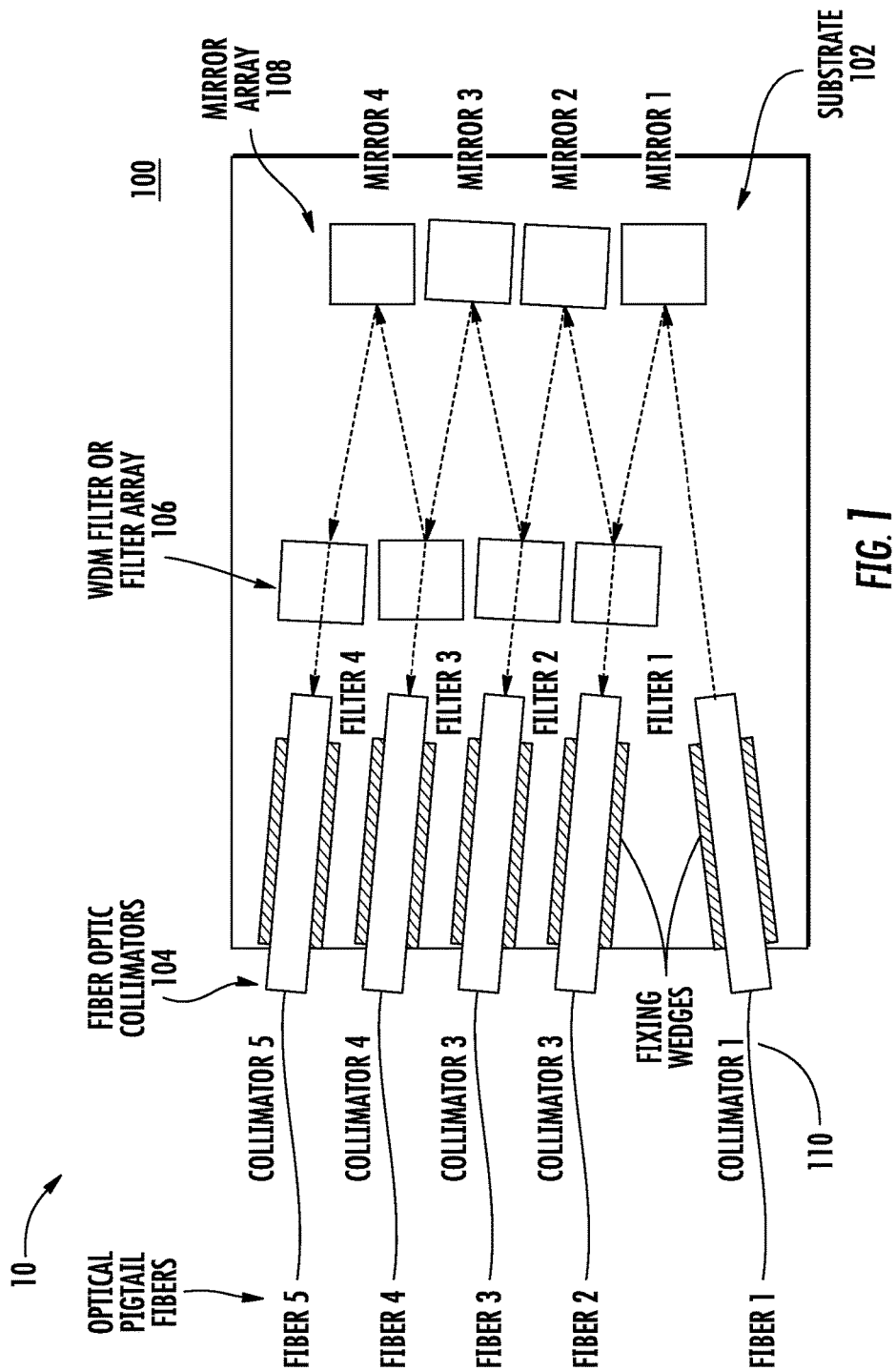
FIG. 1 depicts an example design of a typical compact optical multiplexer/demultiplexer design.
Figure 2A:
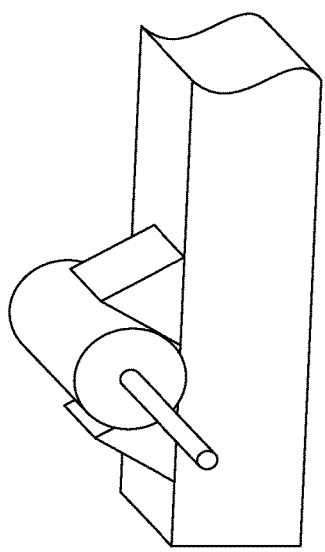
FIGS. 2A-2D depict different example mountings of collimators to a flat substrate using a pair of wedges.
Figure 2B:
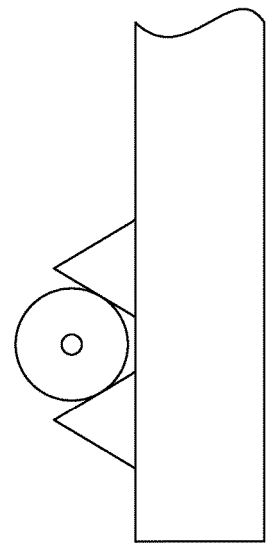
Figure 2C:
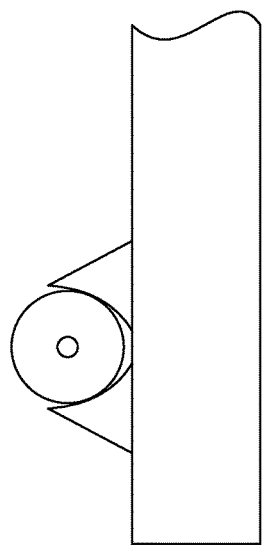
Figure 2D:
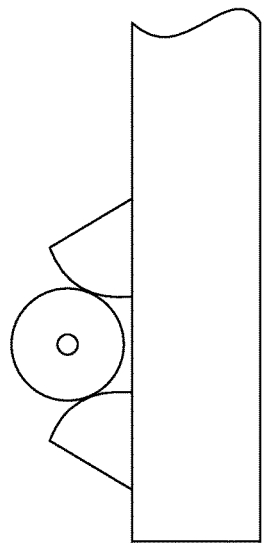
Figure 3:
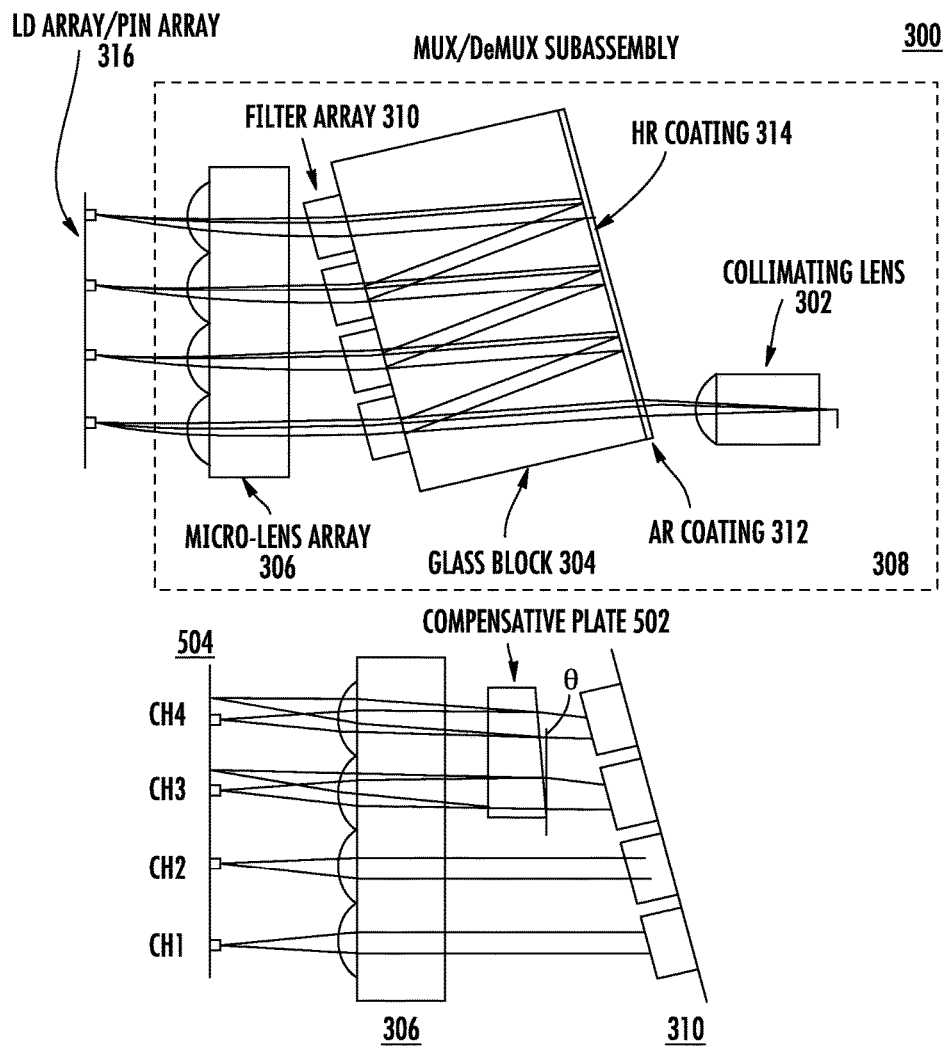
FIG. 3 depicts another example of a multiplexer/demultiplexer subassembly design.
Figure 4:
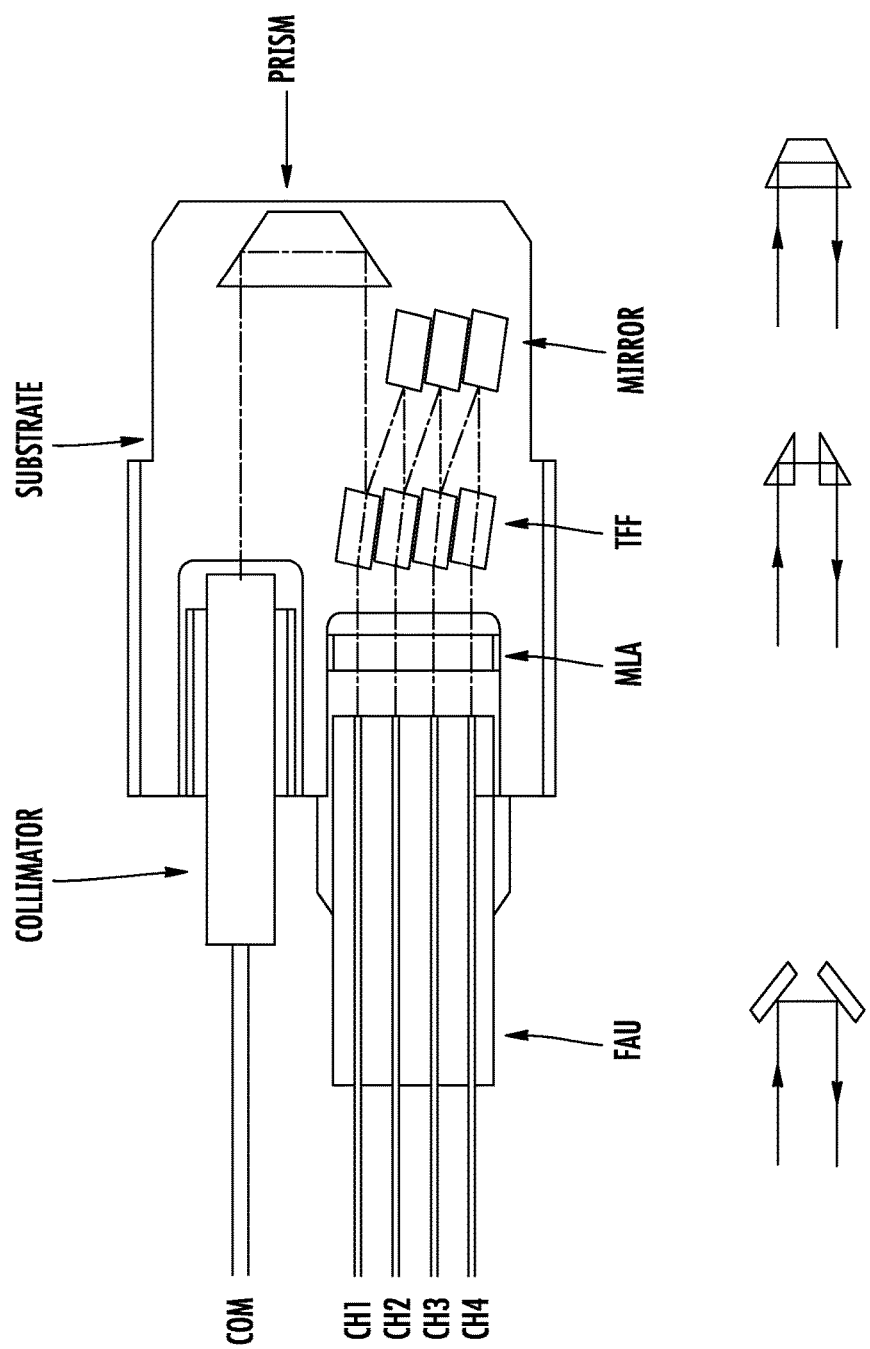
FIG. 4 depicts yet another example compact WDM multiplexer/demultiplexer design.
Figure 5:
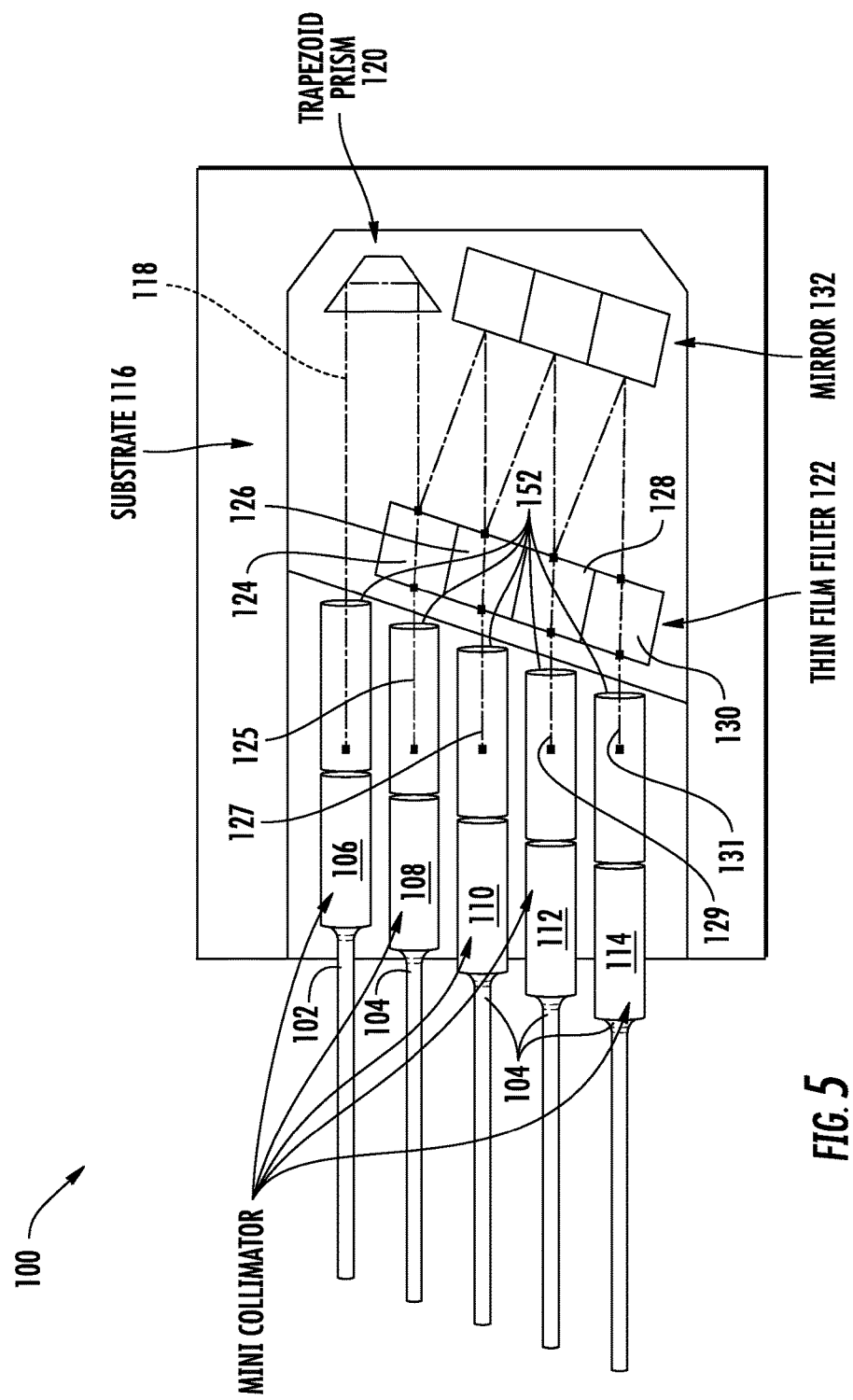
FIG. 5 depicts an example embodiment of a compact free-space WDM multiplexer/demultiplexer, according to one or more embodiments described or shown herein.

FIG. 5 depicts an example embodiment of a compact free-space WDM multiplexer/demultiplexer 100 configuration that provides a compact design while still allowing for alignment of individual channels. In this particular embodiment, signal transmittal and reception ports 102, 104 of the WDM multiplexer/demultiplexer 100 each comprise miniature-sized collimators 106, 108, 110, 112, 114 disposed on the same side of a substrate 116. A complex, multiplexed light signal 118 is received at a prism 120 (e.g., a trapezoid prism) and redirected 180 degrees back toward a thin film filter array 122. The thin film filter array 122 comprises a plurality of demultiplexed channel subsections 124, 126, 128, 130, each configured as a band pass filter (BPF) to pass a predetermined component/channel 125, 127, 129, 131 of the multiplexed light signal 118 and reflect the remainder of the multiplexed light signal 118 toward mirror 132 offset and opposing the thin film filter array 122. The mirror 132, in turn, reflects the multiplexed light signal toward the next channel subsection 126, 128, 130 of the thin film mirror 122.

In this embodiment, when the WDM multiplexer/demultiplexer 100 operates as a demultiplexer, the complex, multiplexed light signal 118 is received at the port 102 via collimator 106, which collimates the light. In the particular embodiment shown in FIG. 5, the collimated beam is then turned 180 degrees with a preset offset determined by a trapezoid prism 120. The multiplexed light signal 118 subsequently propagates to a light splitting sub-module which including the mirror 132 and thin film filter array 122. In this particular embodiment, the thin film filter array 122 comprises four band pass filter sections (although any number of sections may be used), with each of them configured to allow a certain wavelength range to pass through and reflect other wavelengths of the multiplexed light signal. After multiple bounces between the thin film filter array 122 and the mirror 132, the multiplexed light signal beam is split to four demultiplexed light signals 125, 127, 129, 131 with different wavelengths. The demultiplexed signals 125, 127, 129, 131 are collected by the corresponding collimators 108, 110, 112, 114 of the receiving ports 104.

FIGS. 6A-6B illustrate one example embodiment of a miniature sized collimator 150. FIG. 6A, for example, shows a side view of the collimator 150, and FIG. 6B shows an end view of the collimator 150. The collimator 150 includes a lens 152 (e.g., a glass or silica collimating lens), a fiber optic pigtail 154 and a groove 156 (e.g., a generally V-shaped groove) formed in a base 158. The lens 152 and pigtail 154 are disposed in the groove. The lens 152 is configured to receive a light signal provided to the WDM multiplexer/demultiplexer from an external optical transmission system or provide a light signal multiplexed or demultiplexed by the WMD to an external optical transmission system. The lens 152, for example, may be configured to receive a light signal from a fiber optic element for multiplexing or demultiplexing and/or to provide a multiplexed or demultiplexed light signal to an external fiber optic element. The fiber optic pigtail 154 is optically coupled to the lens 152 and is configured to provide a light signal to the lens 152 from the external fiber optic element and/or to receive the light signal from the lens 152 for transmission to the external fiber optic element.

In various embodiments, the lens 152 and the fiber optic pigtail 154 may or may not contact each other. The lens 152 and the fiber optic pigtail 154 may be securable to the groove 156 independent of each other to allow for precise adjustment of a pointing angle between an optical beam from the collimator 150 and a side and/or bottom surface of the groove 156. In addition, the lens 152 and fiber optic pigtail 154 may have the same outer diameter.

The base 158 of the collimator 150 has a generally flat bottom surface 159 for mounting on a substrate of a WDM multiplexer/demultiplexer or other optical system. The base 158 further includes a width 200 that is less than a width 202 of the lens 152 and a width of the fiber optic pigtail 154. In some embodiments, for example, the collimator 150 may be arranged side-by-side, such as shown in FIG. 5, on a surface of a substrate. In the embodiment of FIG. 5, for example, a spacing between the bases 158 (not shown in FIG. 5) of the side-by-side collimators 106, 108, 110, 112, 114 is greater than a spacing between the lenses 152 and fiber optic pigtails 154 of the side-by-side collimators 106, 108, 110, 112, 114.

FIGS. 6C-6D illustrate another example embodiment of a miniature sized collimator 160. FIG. 6C, for example, shows a side view of the collimator 160, and FIG. 6D shows an end view of the collimator 160. In this particular embodiment, the collimator 160 includes a lens 162 (e.g., a glass or silica collimating lens), a fiber optic pigtail 164 and a groove 166 (e.g., a generally U-shaped groove) formed in a base 158. The lens 162 is configured to receive a light signal provided to the WDM multiplexer/demultiplexer from an external optical transmission system or provide a light signal multiplexed or demultiplexed by the WMD to an external optical transmission system. The lens 162, for example, may be configured to receive a light signal from a fiber optic element for multiplexing or demultiplexing and/or to provide a multiplexed or demultiplexed light signal to an external fiber optic element. The fiber optic pigtail 164 is optically coupled to the lens 162 and is configured to provide a light signal to the lens 162 from the external fiber optic element and/or to receive the light signal from the lens 162 for transmission to the external fiber optic element. The base 168 of the collimator 160 has a generally flat bottom surface 169 for mounting on a substrate of a WDM multiplexer/demultiplexer or other optical system.

Although the embodiments shown in FIGS. 6A-6D include generally V-shaped and generally U-shaped grooves 156 and 166, respectively, other shapes of grooves may also be used.

The collimators 150, 160 provide, for example, a free space path at least partially within the groove 156, 166 for a light signal to propagate between an internal optical system of the WDM multiplexer/demultiplexer and the lens 152, 162, respectively. In this manner, the collimator does not need a glass tube or structure to confine the lens and fiber optic pigtail of the collimator 160, 170. This reduces the outside/lateral dimension of the collimator by removing the outside confinement dimension due to the glass tube, resulting in some embodiments in a lateral dimension that may entirely depend on the dimension of the lens and/or fiber optic pigtail. For example, the groove 156, 166 of the collimator structure may extend into the base 158, 168 and provides a transmission path at least partially extending into a depth of the base 158, 168 and, thus, may further reduce the form factor of the overall multiplexer/demultiplexer.

Also, the collimators 150, 160 need not be fixed to the substrate using external wedges or other structures disposed on a surface of the substrate that take lateral spacing between adjacent collimators and, thus, allow for reduced pitch sizes between individual collimators. Not only can a single collimator lateral dimension can be significantly reduced, but also interspacing between neighbor collimators may be reduced without losing contact region with the substrate.

Referring now to FIG. 7, a pointing angle between an optical beam from a miniature size collimator 170 and the side and bottom surface of the groove 156 can be eliminated (or at least reduced) by controlling the relative position between a lens 172 and a fiber pigtail 174 of the collimator 170. FIG. 7, for example, shows an example embodiment of an adjustable interface between a lens 172 and a fiber optic pigtail 174 of a collimator 170. FIG. 7 further illustrates an example principle of point angle monitoring and relative adjustment of the lens 172 and fiber optic pigtail 174. By fine tuning the position of fiber optic pigtail 174 to make an outgoing beam come across a focal point of the lens 172, a collimated zero pointing angled beam with negligible off axis offset can be achieved. In one embodiment, for example, the tuning can be monitored by near field and far field beam position comparison (e.g., using a beam scanner). The zero pointing angle collimating components are easier to attach to the substrate with little inclination and more reliable bonding is possible due to the uniform epoxy or bonding agent can be achieved. It is noted that FIG. 7 is a schematic illustration used to illustrate concepts of the description and that the ends of the glass lens and the fiber pigtail may be oriented at other angles, including perpendicular, to the body of the glass lens and the fiber pigtail, respectively.

The structures of the collimators 160, 170 allow for easier modularization and remove redundant degrees of freedom versus designs in which a collimator is coupled and attached to the substrate via external wedges or supports. Thus, the collimators 160, 170 may reduce the complexity and further increase the assembly efficiency and process reliability of the overall multiplexer/demultiplexer design.

FIG. 8 shows an example flowchart of a process 180 of constructing a collimator, such as for use on a substrate of a WDM multiplexer/demultiplexer or within another optical system. In this embodiment, for example, the process 180 includes an operation 182 of forming a groove in a base element of a collimator. The groove, for example, may include cross-sectional shapes such as but not limited to a generally V-shaped groove, a generally U-shaped groove or generally square or rectangular shape into which a lens may be mounted. A lens is disposed in the groove in operation 184, and a fiber optic pigtail is disposed in the groove in operation 186 in optical communication with the lens. The fiber optic pigtail may be disposed, for example, generally around the focal point of the lens such that an optical signal focused by the lens is coupled to the pigtail for communication with an external optical transmission system. The lens and fiber optic pigtail are aligned with respect to each other in operation 188 and fixed (e.g., bonded, adhered and/or epoxied) to the groove of the base in operation 190.

It is noted that recitations herein of "at least one" component, element, etc., should not be used to create an inference that the alternative use of the articles "a" or "an" should be limited to a single component, element, etc.

It is also noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the terms "generally," "substantially" and "approximately" are utilized herein to represent the inherent degree of uncertainty that may be attributed to any quantitative comparison, value, measurement, or other representation. The terms "generally," "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A free-space optical collimator comprising:
a base having a length, a generally flat bottom surface and a top surface, wherein the generally flat bottom surface is configured for mounting on a substrate and a groove is disposed along the top surface extending through the length of the base;
a lens disposed within the groove of the base; and
a fiber optic pigtail disposed generally adjacent a focal point of the lens,
wherein the lens and the fiber optic pigtail are aligned within the groove to reduce an off-angle offset of an optical light signal propagating through the free-space optical collimator, wherein widths of the lens and fiber optic pigtail are wider than a width of the base.

2. The collimator of claim 1, wherein the groove comprises a generally V-shaped groove.

3. The collimator of claim 1, wherein the groove comprises a generally U-shaped groove.

4. The collimator of claim 1, wherein the lens and pigtail are fixed within the groove via one or more of the group comprising an adhesive and an epoxy.

5. The collimator of claim 1, wherein the lens comprises a glass lens.

6. The collimator of claim 1, wherein the collimator comprises a first port corresponding to a distal end of the fiber optic pigtail and a second port corresponding to an output of the lens.

7. The collimator of claim 6, wherein the collimator is configured to receive a light signal at the first port and provide a collimated light signal output from the second port.

8. The collimator of claim 6, wherein the collimator is configured to receive a collimated light signal at the second port and provide an output light signal from the first port.

9. The collimator of claim 1, wherein the base is mounted on a substrate adjacent to a second collimator comprising a second base, a second lens disposed within a second groove of the second base and a second fiber optic pigtail disposed generally adjacent a second focal point of the second lens.

10. The collimator of claim 9, wherein a base spacing between the base of the collimator and second base of the second collimator is greater than a lens spacing between the lens of the collimator and the second lens of the second collimator.

11. The collimator of claim 10, wherein the base spacing is greater than a pigtail spacing between the fiber optic pigtail of the collimator and the second fiber optic pigtail of the second collimator.

12. A multi-channel wavelength division multiplexer comprising:
a substrate;
a multiplexer port configured to propagate a multiplexed optical signal, the multiplexer port comprising a first optical collimator mounted on a surface of the substrate:
a first demultiplexer port configured to propagate a first demultiplexed optical signal, the first demultiplexer port comprising a second optical collimator;
a second demultiplexer port configured to propagate a second demultiplexed optical signal, the first demultiplexer port comprising a third optical collimator; and
an optical filtering component mounted to the substrate and optically coupled between the multiplexer port and the pair of first and second demultiplexer ports, wherein the optical filtering component is configured to separate a multiplexed light signal from the multiplexer port into at least first and second wavelength components and propagate the at least first and second wavelength components to the first and second demultiplexer ports, respectively,
wherein at least one of the first, second and third optical collimators comprise:
a base having a length, a generally flat bottom surface and a top surface, wherein the generally flat bottom surface is configured for mounting on the substrate and a groove is disposed along the top surface extending through the length of the base;
a lens disposed within the groove of the base, wherein a width of the lens is wider than the base; and
a fiber optic pigtail disposed generally adjacent a focal point of the lens, wherein the lens and the fiber optic pigtail are aligned within the groove to reduce an off-angle offset of an optical light signal propagating through the free-space optical collimator.

13. The multi-channel wavelength division multiplexer of claim 12, wherein the optical filtering component comprises a filter array and a mirror disposed opposite the filter array.

14. The multi-channel wavelength division multiplexer of claim 13, wherein the filter array and the mirror of the optical filtering element are arranged such that a multiplexed optical signal entering the optical filtering component via the multiplexer port can pass through the filter array and the mirror of the optical filtering component in a back-and-forth progression to successive thin-film filter elements of the filter array for successive wavelength-selective transmission at the first and second demultiplexer ports.

15. The multi-channel wavelength division multiplexer of claim 14, wherein the filter array and the mirror of the optical filtering element are further arranged such that the first and second demultiplexed optical signals entering the optical filtering element via the first and second demultiplexer ports can pass through the filter array and the mirror of the optical filtering element in a back-and-forth progression for multiplexing at successive ones of the thin film filter elements and multiplexed transmission via the multiplexer port.

16. The multi-channel wavelength division multiplexer of claim 13, wherein the filter array comprises a plurality of band pass filters corresponding to the first and second wavelength.

17. The multi-channel wavelength division multiplexer of claim 16, wherein the optical filtering component comprises prism configured to propagate the multiplexed optical signal between the multiplexer port and the filter array and mirror of the optical filtering component.

18. The multi-channel wavelength division multiplexer of claim 12, wherein the first, second and third optical collimators are mounted side-by-side to a surface of a substrate via a base and a base spacing between the bases of the first and second collimators and second and third collimators is greater than a lens spacing between lenses of the first and second collimators and lenses of the second and third collimators, respectively.

19. A process of producing a free-space optical collimator comprising:
    forming a groove in a top surface of a base element;
    disposing a lens in the groove;
    disposing a fiber optic pigtail at least generally adjacent to a focal point of the lens;
    aligning the lens and the fiber optic pigtail within the groove to reduce an off-angle offset of an optical light signal propagating through the free-space optical collimator; and
    fixing the lens and fiber optic pigtail within the groove to form a free-space transmission path between the groove and the lens for the optical light signal to partially propagate through.

* * * * *